United States Patent Office 2,954,554
Patented Sept. 27, 1960

2,954,554

RADAR SYNCHRONIZING APPARATUS

Charles F. Feltham, Jr., Huntington, N.Y., assignor to Hazeltine Research, Inc., Chicago, Ill., a corporation of Illinois Filed Feb. 11, 1957, Ser. No. 639,578

8 Claims. (Cl. 343—100)

This invention relates to synchronizing apparatus for use with radar scanning systems and, particularly, to synchronizing apparatus for controlling the timing of the antenna radiations of such systems. The subject matter of this application is related to a copending application Serial No. 639,577, filed February 11, 1957, entitled "A Radar Scanning System," now abandoned.

The subject matter of the copending application relates to a scanning system designed to improve the performance of radar apparatus limited by scanning loss and, in particular, rapid scan radars. Scanning loss causes a decrease in signal power available to the radar receiver for detecting distant objects as compared to the signal power available in a radar receiver not limited by scanning loss. As considered in the copending application, such scanning loss may be minimized by causing the radar antenna to radiate along one set of radii during one scanning period of the antenna and along radii intermediate that of the first set during the next succeeding scanning period. The present invention is directed to an improved form of synchronizing apparatus for use with radar scanning systems of the latter kind.

It is, therefore, an object of this invention to provide new and improved synchronizing apparatus for use with a radar scanning system for minimizing antenna scanning loss.

It is a further object of the invention to provide a new and improved synchronizing apparatus for causing a radar apparatus, including an antenna, to radiate along one set of radii during one scanning period of the antenna and along radii intermediate that of the first set during the next succeeding scanning period.

In accordance with the invention, in a radar scanning system including an antenna which radiates along one set of radii during one scanning period of the antenna and along radii intermediate that one set during the next succeeding scanning period, a synchronizing apparatus comprises circuit means responsive to the antenna rotation for developing trigger signals. The synchronizing apparatus also includes circuit means responsive to the trigger signals for developing a control signal at different times in successive antenna scanning periods. Additionally, the synchronizing apparatus includes circuit means responsive to the trigger and control signals for terminating the antenna radiations at the end of one antenna scanning period and initiating antenna radiations during the next antenna scanning period at different times in successive antenna scanning periods. Thereby, the synchronizing apparatus causes antenna radiation to be along one set of radii during one scanning period of the antenna and along radii intermediate the one set during the next succeeding scanning period.

For a better understanding of the present invention, together with other and further objects thereof, reference is had to the following description taken in connection with the accompanying drawings, and its scope will be pointed out in the appended claims.

Referring to the drawings.

Figure 1:
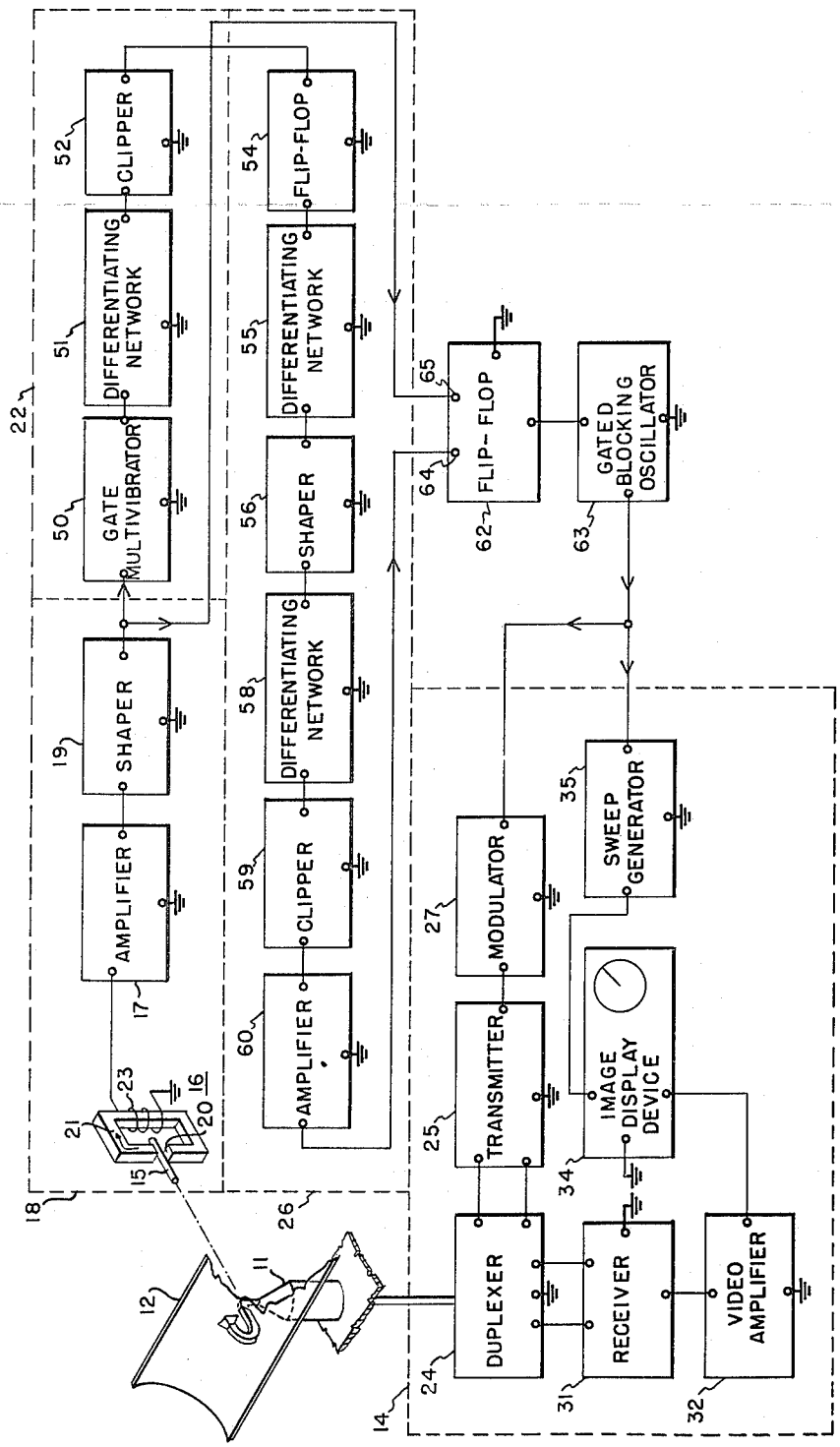
Fig. 1 is a circuit diagram of a radar apparatus utilizing a representative embodiment of a synchronizing apparatus constructed in accordance with the present invention.

Referring now to Fig. 1, there is represented a radar apparatus, including an antenna, and synchronizing apparatus constructed in accordance with this invention. The synchronizing apparatus includes circuit means responsive to the antenna scanning function for developing trigger signals. This circuit means comprises a pulse generator 18, within the dash lines, and includes permanent magnet 15 acting in conjunction with electromagnetic device 16 and the series combination of amplifier 17 and shaper 19. Electromagnetic device 16 includes a substantially closed magnetic flux path 21 containing air gap 20. The length of air gap 20 is such that permanent magnet 15 may pass therein. In addition, electromagnetic device 16 contains coil 23 disposed around the magnetic flux path 21 and coupled through amplifier 17 to the input of shaper 19. Amplifier 17 and shaper 19, acting as a limiter, are conventional circuits for squaring off the extremities of an applied signal.

The synchronizing apparatus further includes circuit means responsive to the trigger signals for developing control signals at a time different in one scanning period of the antenna than in the next succeeding scanning period. This circuit means for developing control signals includes a delay circuit 22, within the dash lines, comprising gate multivibrator 50, differentiating network 51, and clipper 52, in cascade in the order named. Gate multivibrator 50 may be conventional in construction and operation for developing a single gate of predetermined duration in response to the trigger signal from shaper 19. The output of gate multivibrator 50 is coupled through differentiating network 51 constructed, for example, as an RC network, to clipper 52. Clipper 52 may also be conventional in nature, for example, a biased diode, and operates to remove the positive portions of signals received at its input terminal. The circuit means for developing control signals additionally includes, in cascade, a series of elements comprising timing circuit 26, within the dash lines, for developing control signals at a time different in one scanning period of the antenna than in the next succeeding scanning period. These elements include, in cascade in the order named, flip-flop 54, differentiating network 55, shaper 56, differentiating network 58, clipper 59, and amplifier 60. Taken individually and without reference to their function in the present apparatus, these circuit elements may be conventional in construction and operation and each may assume any of the several forms well known in the art. The input to flip-flop 54 derived from clipper 52 acts to effect a change in the condition of stability with each applied signal. The output from flip-flop 54 is applied through differentiating network 55 to shaper 56. The parameters in shaper 56 are such that a negative input signal is amplified and limited to form a pulse of predetermined duration. A positive signal is merely amplified without appreciable shaping. The limiting action required for shaping the negative input signal to shaper 56 may be supplied by, for example, a triode amplifier biased near cutoff. The output from shaper 56 is fed through differentiating network 58 to clipper 59 where the positive signals are removed before the output from clipper 59 is coupled to amplifier 60.

Amplifier 60 acts to invert the polarity of and to amplify the signal applied to its input terminal to an amplitude sufficient to carry on succeeding operations.

Additionally, the synchronizing apparatus includes circuit means responsive to the trigger and control signals for terminating the antenna radiations at the end of one antenna scanning period and initiating antenna radiations at the start of the next scanning period at different times in succeeding scanning periods. This circuit means includes flip-flop 62 and gated blocking oscillator 63. Input signals for flip-flop 62 are derived from shaper 19 and amplifier 60. Flip-flop 62 in a conventional manner may assume either of two conditions of stability. The action of flip-flop 62 is such that the first of a series of recurrent signals applied to one input may alter the condition of stability, the subsequent signals to that input having no effect unless a change to the original stable state was effected by a signal applied to the other input of the flip-flop 62. The output from flip-flop 62 is coupled to gated blocking oscillator 63. Gated blocking oscillator 63 may be constructed as a conventional free-running blocking oscillator capable of being gated off by the action of a positive signal applied from flip-flop 62. Gated blocking oscillator 63 develops periodic signals when operative.

The Fig. 1 embodiment includes a block diagram of a representative embodiment of a conventional radar apparatus 14 with which the synchronizing apparatus of the present invention may be utilized. The circuit elements comprising radar apparatus 14 may be conventional in construction and operation and similar to the units described on page 7, volume 1, of the MIT Radiation Series, entitled "Radar Engineering." The basic trigger signals for activating the transmitter 25 and sweep generator circuits 35 are coupled from the gated blocking oscillator 63. These signals act to synchronize the operation of radar apparatus 14. Included in radar apparatus 14 is antenna 12 which is rotated in a prescribed plane by the action of the driving mechanism contained in pedestal 11. Physically attached to antenna 12 or made to rotate in synchronism with antenna 12 is permanent magnet 15.

In order to cause the antenna to radiate along one set of radii during one scanning period of the antenna and along radii intermediate that one set during the next succeeding scanning period, the synchronizing apparatus must coordinate the operation of a radar transmitter to that of the antenna scanning motion. In the present invention the antenna motion may, for convenience, be considered as the reference source and the control pulses for energizing the radar transmitter and, consequently, causing the antenna to radiate are synchronized thereto. At a predetermined position in each revolution of the antenna a signal generator develops a trigger signal which is utilized in performing a dual function. The first function of the trigger signal is to terminate the antenna radiations at an instant corresponding to the predetermined antenna position. The second function pertains to initiating timing circuits for controlling the resumption of the antenna radiations during the next scanning period. The synchronizing apparatus also includes means for continued activation of the radar transmitter at periodic intervals after the initial transmission. The pulse repetition frequency of the transmitter during the scanning period corresponds to a pulse repetition period equal to $\Delta t$.

A fixed minimum delay between the termination of the antenna radiation at the conclusion of a first sweep and the reactivation in the next antenna sweep of the radar radiation has been designed into the present invention. This delay, hereinafter designated as $r_t$, assures a satisfactory recovery of the radar apparatus from the terminating action of the antenna trigger signal. During one antenna scan period the antenna radiation is activated at the conclusion of the initial delay interval $r_t$ and at periodic intervals thereafter. However, in the next antenna scanning period the antenna radiations are activated by the antenna trigger at a time equal to the sum of the initial delay interval plus one-half of the period between radiations or $$r_t + \frac{\Delta t}{2}$$

In this fashion the antenna radiations in alternate antenna scanning periods occur on radii separated in time by the interval $$\frac{\Delta t}{2}$$

Figure 2:
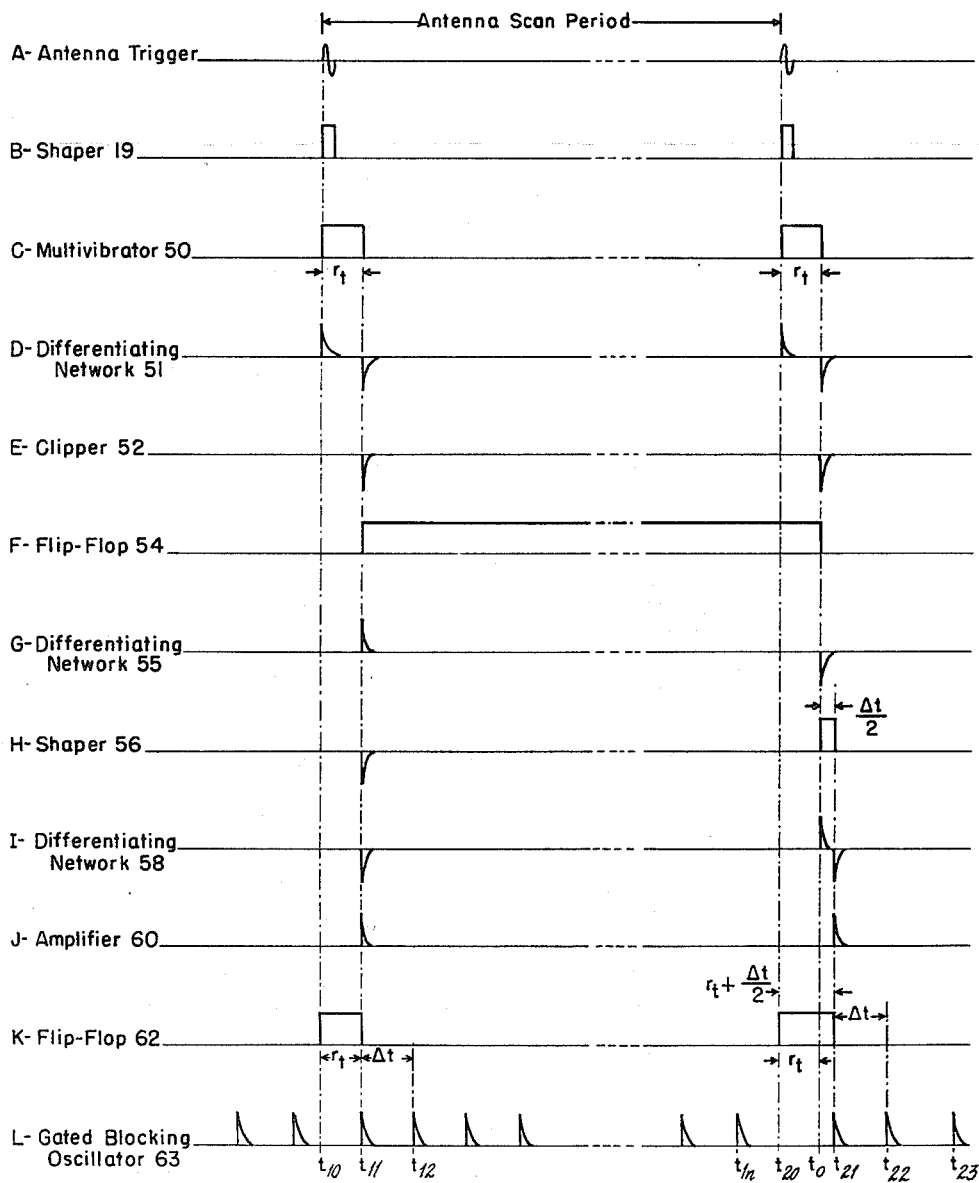
Fig. 2 represents a series of curves useful in explaining the operation of the Fig. 1 embodiment.

In considering the operation of the Fig. 1 embodiment and the manner by which the synchronizing apparatus controls antenna radiation, reference is made to curves in Fig. 2. Curves A–L, inclusive, represent the output signals of the circuit elements with which they are identified. Initially it is assumed that radar apparatus 14 is functioning in its normal manner and, for the purpose of describing the operation of this invention, a typical sequence of events will be discussed. Antenna 12 is rotating in a prescribed plane and permanent magnet 15 because it is physically attached to antenna 12 is thereby caused to rotate in synchronism with antenna 12. Once each revolution at a predetermined point in the rotation pattern, permanent magnet 15 traverses the air gap 20 activating the pulse generator circuit 18. For example, at time $t_{10}$ permanent magnet 15 enters air gap 20. The flux density in permanent magnet 15 is of sufficient intensity to traverse the air gap into magnetic flux path 21. Because of the motion of permanent magnet 15 through air gap 20, the flux induced in magnetic flux path 21 is fluctuating and, consequently, a single cycle of alternating voltage is induced in coil 23. This signal represents the basic synchronizing signal for the Fig. 1 radar system and is represented in curve A of Fig. 2. The signal from coil 23 is amplified by amplifier 17 and coupled to shaper 19 where it is shaped into a more convenient pulse form. Curve B in Fig. 2 is a representation of the output pulse of shaper 19.

A portion of the output of shaper 19 is coupled to input terminal 65 of flip-flop 62 causing the output of flip-flop 62 to go positive at time $t_{10}$. This action is depicted in curve K of Fig. 2. The remaining portion of the output signal from shaper 19 is coupled to delay circuit 22 comprising gate multivibrator 50, differentiating network 51, and clipper 52. Delay circuit 22, in effect, delays the trigger signal from shaper 19 for an interval $r_t$. The input signal to delay circuit 22 is utilized to develop a pulse at time $t_{11}$. Gate multivibrator 50, in response to the signal applied from shaper 19, generates a positive gate whose duration is equal to $r_t$. This gate is differentiated in differentiating network 51 and the positive segment of the resulting signal is removed by the action of clipper 52. Consequently, the output from clipper 52 consists of a negative pulse at time $t_{11}$ separated from the trigger pulse by an interval $r_t$. Curves C, D, and E in Fig. 2 are a representation of the voltages developed in delay circuit 22.

The output from delay circuit 22 is coupled to flip-flop 54 in timing circuit 26. Flip-flop 54, in response to the output from clipper 52, changes its condition of stability and the voltage at its output is made to go positive at time $t_{11}$. The output voltage of flip-flop 54, as depicted in curve F of Fig. 2, is coupled to differentiating network 55 and differentiated thereby (see curve G) and applied to shaper 56. As was heretofore discussed in the description of the Fig. 1 embodiment, shaper 56 upon application of a positive signal merely amplifies this signal without appreciably changing its shape (see curve H). Consequently, the signal applied to amplifier 60 is representative of the signal developed at the differentiating network 55 but somewhat increased in amplitude. The output of amplifier 60, shown in curve J of Fig. 2, occurring at time $t_{11}$ is coupled to terminal 64 of flip-flop 62 thereby causing the output voltage of flip-flop 62 to go negative at time $t_{11}$.

Referring now to curve K in Fig. 2, it is seen that the voltage at the output of flip-flop 62 starting at $t_{10}$ consists of a pulse whose duration is equal to $r_t$ and which terminates at $t_{11}$. This gate signal when applied to gated blocking oscillator 63 terminates the free-running blocking oscillator action thereof during the time interval $t_{10}$–$t_{11}$. The output pulses from gated blocking oscillator 63, when it is not disabled by the gate signal from flip-flop 62, are periodic in nature and are separated by an interval $\Delta t$.

As heretofore discussed, flip-flop 62 does not change its condition of stability until after it receives a pulse signal from shaper 19 at terminal 64. The output pulses from gated blocking oscillator 63 are also coupled to the modulator 27 and sweep generator circuit 35 of radar apparatus 14 for synchronizing the operation of the radar apparatus 14 for the remainder of the antenna scanning period.

The conclusion of the first antenna scan period occurs at time $t_{20}$ and coincides with the start of the second antenna scanning period. In describing the operation of the Fig. 1 embodiment during a second scanning period, curves A–L in Fig. 2 may be referred to in a manner heretofore described. At time $t_{20}$, permanent magnet 15 again enters air gap 20 thereby activating pulse generator 18. The sequence of events heretofore described for pulse generator 18 is once again enacted and a pulse is produced at the output of shaper 19 at time $t_{20}$. A segment of the output signal from shaper 19 is fed to terminal 65 of flip-flop 62 thereby causing the output voltage from flip-flop 62 to go positive terminating at time $t_{20}$ the series of pulses generated by gated blocking oscillator 63. The remaining segment of the output signal from shaper 19 is coupled to delay network 22. Gate multivibrator 50 at the input of delay network 22, in response to the trigger signal, develops a positive gate starting at $t_{20}$, terminating at $t_0$, and whose duration is equal to $r_t$. This gate is coupled through differentiating network 51 and clipper 52 whereby a negative pulse is developed at time $t_0$. The condition of stability of flip-flop 54 is reversed by the application of this negative pulse from clipper 52 and the output voltage from flip-flop 54, as represented by curve F of Fig. 2, is sharply reduced. Differentiating network 55 differentiates the negative-going voltage from flip-flop 54 and develops a negative pulse at its output which, when applied to shaper, 56, is developed into a positive pulse of predetermined width as indicated by curve H. The width of the output pulse from shaper 56 is determined by the parameters of shaper 56 and is made to equal $$\frac{\Delta t}{2}$$

or one-half of the repetition frequency of gated blocking oscillator 63. The output pulse from shaper 56 is differentiated in differentiating network 58 and the positive segment is removed in clipper 59. The negative segment of the differentiated signal, occurring at time $t_{21}$, is applied to amplifier 60 where it is amplified and applied to the input of flip-flop 62. The result of the foregoing operations is to provide at time $t_{21}$, after an elapsed time from the antenna trigger signal equal to $$r_t + \frac{\Delta t}{2}$$

a control pulse for initiating the antenna radiation. As heretofore discussed, the signal applied to flip-flop 62 terminates the disabling pulse to gated blocking oscillator 63 from flip-flop 62. Gated blocking oscillator 63 thereby starts to generate periodic signals, each separated by the pulse repetition period $\Delta t$, for the remainder of the second scan period.

Figure 3:
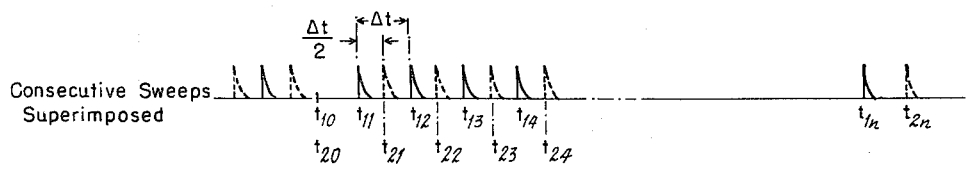
Fig. 3 represents a superposition of the trigger pulses developed in two consecutive sweeps.
Figure 4:
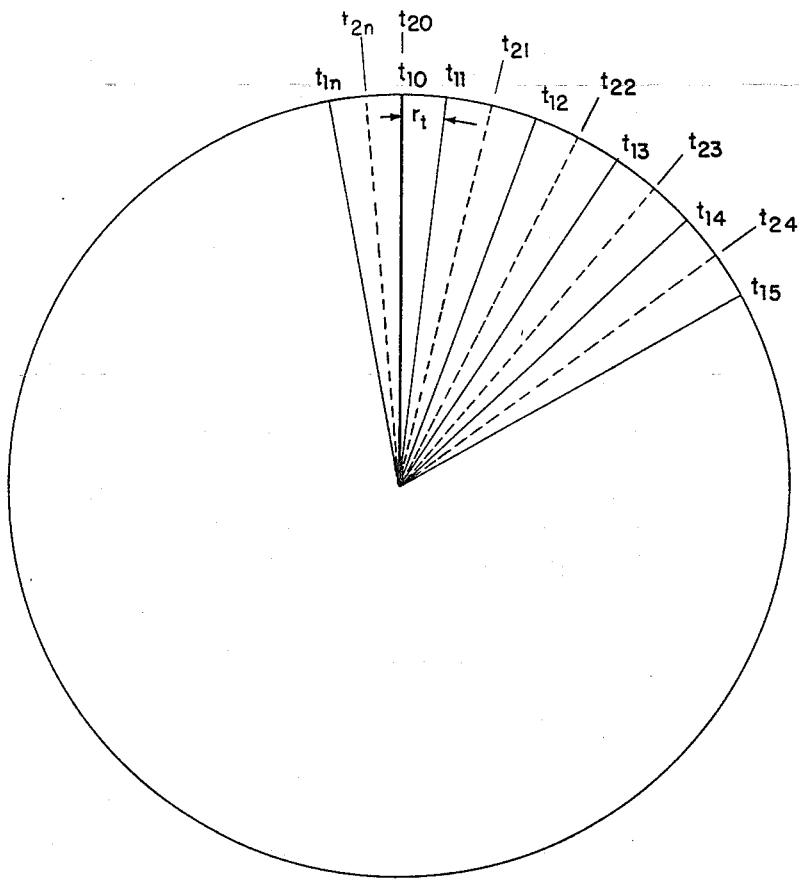
Fig. 4 represents a P.P.I. representation developed in accordance with this invention.

At the start of the third and each odd numbered scanning period thereafter, the sequence of events developed during the first scanning period is repeated. On even numbered scanning periods, the sequence of events developed in the second scanning period is repeated. Consequently, the scanning pattern over the surveillance volume repeats every other sweep of the antenna. Fig. 3 represents a superposition of the control pulses from gated blocking oscillator 63 generated in two successive sweeps with reference to the antenna trigger signal. In accordance with the procedure just discussed, the input pulses to radar apparatus 14 during the second and even numbered scanning periods appear intermediate the input pulses to radar apparatus 14 during the first and odd numbered scanning periods. The scanning pattern owing to the control of transmitter 25 and sweep generator 35 by these input signals is determined by these input signals. Fig. 4 represents a partial P.P.I. display resulting from the application of the trigger pulses, represented in the curve of Fig. 3, to radar apparatus 14.

The radius of the first radiated signal in each antenna scanning period is accurately determined by the synchronizer just described. The spacing of the radii of the succeeding radiated signals in each antenna scanning period should be accurately established in order to assure that the radii of the radiated signals in a particular antenna scanning period appear in the proper relationship intermediate the radii of the radiated signals in the previous antenna scanning period. The determining factors with regard to this requirement are the stability of antenna velocity and the stability of the gated blocking oscillator 63. Neither of these requirements represents serious problems since only a short time stability, in the nature of two antenna scanning periods, is required. The flywheel action of a rapidly spinning antenna mass is inherently stable over a two-revolution period and stable blocking oscillators are commonplace.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radar scanning system including an antenna which radiates along one set of radii during one scanning period of the antenna and along radii intermediate that one set during the next succeeding scanning period, a synchronizing apparatus comprising: circuit means responsive to the antenna rotation for developing trigger signals; circuit means responsive to said trigger signals for developing a control signal at different times in successive antenna scanning periods; and circuit means responsive to said trigger and control signals for terminating said antenna radiations at the end of one antenna scanning period and initiating antenna radiations during the next antenna scanning period at different times in successive antenna scanning periods, thereby causing antenna radiation to be along one set of radii during one scanning period of the antenna and along radii intermediate that one set during the next succeeding scanning period.

2. In a radar scanning system including an antenna which radiates along one set of radii during one scanning period of the antenna and along radii intermediate that one set during the next succeeding scanning period, a synchronizing apparatus comprising: a pulse generator, including an electromechanical sensing element which is coupled to the movable portion of the antenna for developing a trigger pulse each time the antenna completes a scanning period; circuit means responsive to said trigger signals for developing a control signal at a time different in one scanning period of the antenna than in the next succeeding scanning period; and circuit means responsive to said trigger and control signals for terminating said antenna radiation at the end of one antenna scanning period and initiating antenna radiations during the next scanning period at different times in succeeding scanning periods, thereby causing antenna radiation to be along one set of radii during one scanning period of the antenna and along radii intermediate that one set during the next succeeding scanning period.

3. In a radar scanning system including an antenna which radiates along one set of radii during one scanning period of the antenna and along radii intermediate that one set during the next succeeding scanning period, a synchronizing apparatus comprising: a pulse generator responsive to the antenna rotation for developing trigger signals; timing circuits responsive to said trigger signals for developing a control signal at different times, with respect to the trigger signals, in successive antenna scanning periods; and circuit means responsive to said trigger and control signals for terminating said antenna radiations at the end of one antenna scanning period and initiating antenna radiations during the next antenna scanning period at different times with respect to the trigger signals in successive antenna scanning periods, thereby causing antenna radiation to be along one set of radii during one scanning period of the antenna and along radii intermediate that one set during the next succeeding scanning period.

4. In a radar scanning system including an antenna which radiates along one set of radii during one scanning period of the antenna and along radii intermediate that one set during the next succeeding scanning period, a synchronizing apparatus comprising: circuit means responsive to the antenna rotation for developing trigger signals; a bistable circuit for alternately developing positive-going and negative-going signal changes in response to alternate ones of the trigger signals; circuit means responsive to the positive-going signal changes for developing one set of control signals individually having one time relationship relative to their corresponding trigger signals and responsive to the negative-going changes for developing a second set of control signals individually having a different time relationship relative to their corresponding trigger signals; and circuit means responsive to said trigger and control signals for terminating said antenna radiations at the end of one antenna scanning period and initiating antenna radiations during the next antenna scanning period at different times in successive antenna scanning periods, thereby causing antenna radiation to be along one set of radii during one scanning period of the antenna and along radii intermediate that one set during the next succeeding scanning period.

5. In a radar scanning system including an antenna which radiates along one set of radii during one scanning period of the antenna and along radii intermediate that one set during the next succeeding scanning period, a synchronizing apparatus comprising: circuit means responsive to the antenna rotation for developing trigger signals; a delay circuit for developing time-delayed replicas of the trigger signals; a bistable circuit for alternately developing positive-going and negative-going signal changes in response to alternate ones of the trigger signals; circuit means responsive to the positive-going signal changes for developing one set of control signals individually having one time relationship relative to their corresponding trigger signals and responsive to the negative-going signal changes for developing a second set of control signals individually having a different time relationship relative to their corresponding trigger signals; and circuit means responsive to said trigger and control signals for terminating said antenna radiations at the end of one antenna scanning period and initiating antenna radiations during the next antenna scanning period at different times in successive antenna scanning periods, thereby causing antenna radiation to be along one set of radii during one scanning period of the antenna and along radii intermediate that one set during the next succeeding scanning period.

6. In a radar scanning system including an antenna which radiates along one set of radii during one scanning period of the antenna and along radii intermediate that one set during the next succeeding scanning period, a synchronizing apparatus comprising: signal-generating means responsive to the antenna rotation for developing trigger signals; circuit means responsive to said trigger signals for developing a control signal at a time different in one scanning period of the antenna than in the next succeeding scanning period; and circuit means responsive to said trigger signals for terminating said antenna radiations at the end of one antenna scanning period and responsive to the control signals for initiating antenna radiations during the next scanning period at different times in succeeding scanning periods, thereby causing antenna radiation to be along one set of radii during one scanning period of the antenna and along radii intermediate that one set during the next succeeding scanning period.

7. In a radar scanning system including an antenna which radiates along one set of radii during one scanning period of the antenna and along radii intermediate that one set during the next succeeding scanning period, a synchronizing apparatus comprising: circuit means responsive to the antenna rotation for developing trigger signals; circuit means responsive to said trigger signals for developing a control signal at different times in successive antenna scanning periods; a periodic signal generator for generating radar synchronization pulses; and a gate generator responsive to the trigger signals for initiating a gate signal for disabling the periodic signal generator at the end of each antenna scanning period and responsive to the control pulses for terminating the gate signal to restore the periodic signal generator to an operative condition, thereby causing antenna radiation to be along one set of radii during one scanning period of the antenna and along radii intermediate that one set during the next succeeding scanning period.

8. In a radar scanning system including an antenna which radiates along one set of radii during one scanning period of the antenna and along radii intermediate that one set during the next succeeding scanning period, a synchronizing apparatus comprising: a pulse generator including an electromechanical sensing element which is coupled to a movable portion of the antenna for developing a trigger pulse each time the antenna completes a scanning period; a delay circuit for developing time-delayed replicas of the trigger pulses; a bistable circuit for alternately developing positive-going and negative-going signal changes in response to alternate ones of the trigger signals; circuit means responsive to the positive-going signal changes for developing one set of control pulses individually having one time relationship relative to their corresponding trigger pulses and responsive to the negative-going signal changes for developing a second set of control pulses individually having a different time relationship relative to their corresponding trigger pulses; a periodic signal generator for generating radar synchronization pulses; and a gate generator responsive to the trigger signals for initiating a gate signal for disabling the periodic signal generator at the end of each antenna scanning period and responsive to the control pulses for terminating the gate signal to restore the periodic signal generator to an operative condition, thereby causing antenna radiation to be along one set of radii during one scanning period of the antenna and along radii intermediate that one set during the next succeeding scanning period.

No references cited.